United States Patent
Kato et al.

(10) Patent No.: US 12,141,563 B2
(45) Date of Patent: Nov. 12, 2024

(54) VEHICLE CONTROL SYSTEM AND VEHICLE CONTROL METHOD

(71) Applicant: KABUSHIKI KAISHA TOKAI RIKA DENKI SEISAKUSHO, Aichi (JP)

(72) Inventors: Naofumi Kato, Aichi (JP); Takashi Nagao, Aichi (JP); Tetsuya Egawa, Aichi (JP); Hitoshi Muraki, Aichi (JP); Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 92 days.

(21) Appl. No.: 17/800,796

(22) PCT Filed: Feb. 24, 2021

(86) PCT No.: PCT/JP2021/006914
§ 371 (c)(1),
(2) Date: Aug. 18, 2022

(87) PCT Pub. No.: WO2021/172374
PCT Pub. Date: Sep. 2, 2021

(65) Prior Publication Data
US 2023/0100326 A1  Mar. 30, 2023

(30) Foreign Application Priority Data
Feb. 28, 2020 (JP) .................. 2020-033128

(51) Int. Cl.
*G06F 21/32* (2013.01)
*B60R 16/023* (2006.01)
*B60R 16/037* (2006.01)
*G06F 8/61* (2018.01)
(Continued)

(52) U.S. Cl.
CPC .............. *G06F 8/61* (2013.01); *B60R 16/023* (2013.01); *G06F 21/32* (2013.01); *B60R 25/252* (2013.01);
(Continued)

(58) Field of Classification Search
CPC . G06F 8/61; G06F 21/32; G06F 21/35; G06F 21/629; B60R 16/023; B60R 25/252; H04W 4/80; H04W 4/48; H04W 12/06
See application file for complete search history.

(56) References Cited

U.S. PATENT DOCUMENTS

2014/0094143 A1* 4/2014 Ayotte .................. G06Q 20/00
455/411
2014/0310788 A1* 10/2014 Ricci ..................... G01C 21/26
726/6
(Continued)

FOREIGN PATENT DOCUMENTS

CN  110262445 A  9/2019
JP  11-180222 A  7/1999
(Continued)

OTHER PUBLICATIONS

Guoqi Xe et al., Adaptive Dynamic Scheduling on Multifunctional Mixed-Criticality Automotive Cyber-Physical Systems, Aug. 2017, [Retrieved on Jul. 11, 2024]. Retrieved from the internet: <URL: http://delivery.acm.org/10.1145/2240000/2232005/p1427-balduzzi.pdf?> 17 Pages (6676-6692) (Year: 2017).*

*Primary Examiner* — Anibal Rivera
(74) *Attorney, Agent, or Firm* — Studebaker & Brackett PC

(57) ABSTRACT

A vehicle control system includes a terminal including a storage unit to store additional function information generated by software configured to add a new function to functionality of at least one electronic device mounted on a vehicle and a first communication unit to output the additional function information, and a vehicle control device including a second communication unit to communicate with the terminal through the first communication unit and configured to add a new function to the at least one electronic device based on the additional function information (Continued)

obtained from the terminal through the second communication unit.

11 Claims, 5 Drawing Sheets

(51) Int. Cl.
    *B60R 25/25*     (2013.01)
    *G06F 21/35*     (2013.01)
    *G06F 21/62*     (2013.01)
    *H04W 4/48*     (2018.01)
    *H04W 4/80*     (2018.01)
    *H04W 12/06*     (2021.01)

(52) U.S. Cl.
    CPC ............ *G06F 21/35* (2013.01); *G06F 21/629* (2013.01); *H04W 4/48* (2018.02); *H04W 4/80* (2018.02); *H04W 12/06* (2013.01)

(56) References Cited

U.S. PATENT DOCUMENTS

| | | | |
|---|---|---|---|
| 2015/0019304 A1* | 1/2015 | Vakili | .................. G06Q 20/326 |
| | | | 705/13 |
| 2015/0158413 A1 | 6/2015 | Tatara | |
| 2016/0001720 A1* | 1/2016 | Vadgama | ............... G07B 15/00 |
| | | | 701/2 |
| 2018/0095614 A1* | 4/2018 | Klos | .................. G01C 21/3664 |
| 2019/0280893 A1 | 9/2019 | Ninagawa | |
| 2020/0410073 A1 | 12/2020 | Ohashi | |

FOREIGN PATENT DOCUMENTS

| | | |
|---|---|---|
| JP | 2015-105072 A | 6/2015 |
| JP | 2015-110365 A | 6/2015 |
| JP | 2019-125297 A | 7/2019 |

* cited by examiner

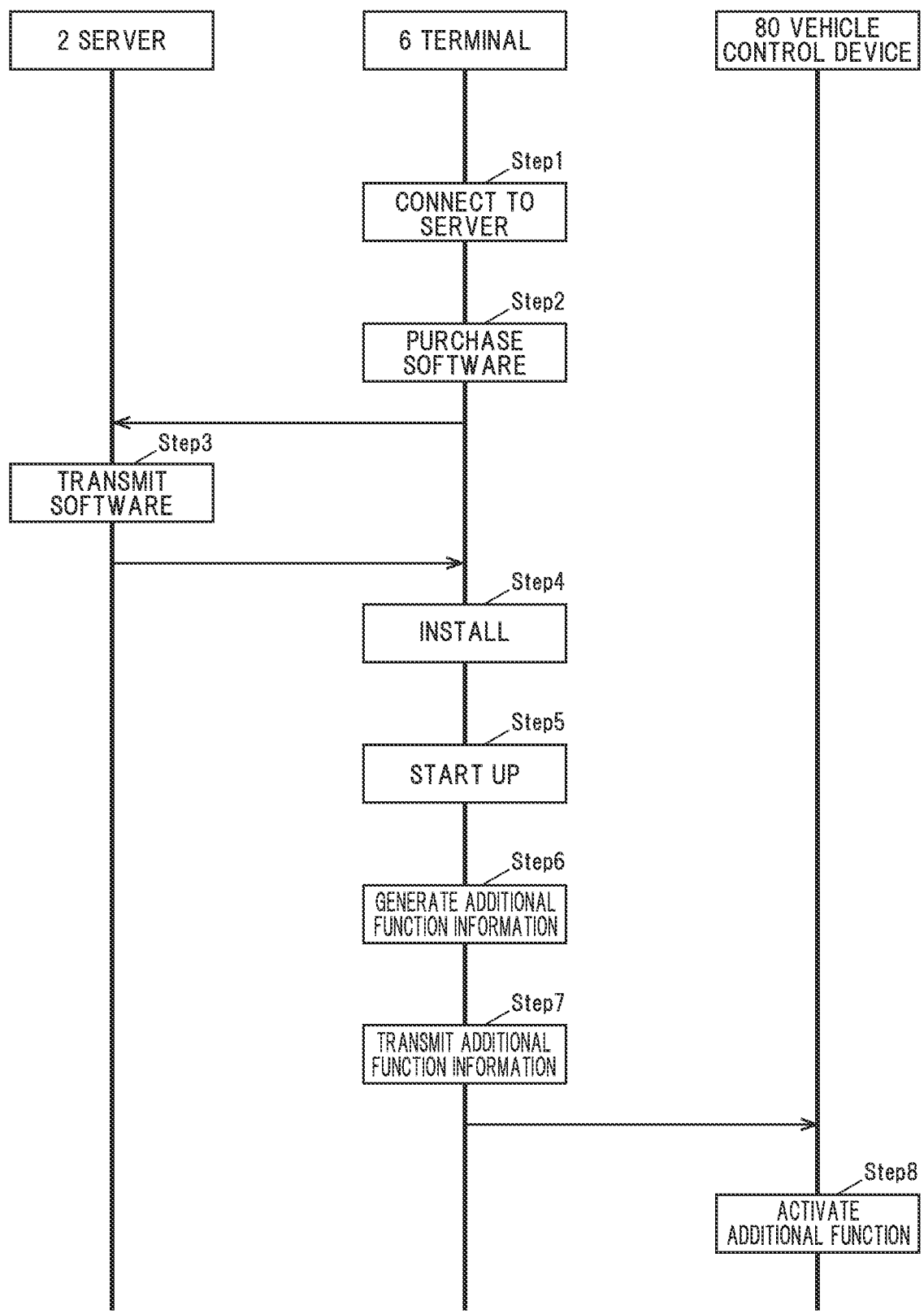

US 12,141,563 B2

VEHICLE CONTROL SYSTEM AND VEHICLE CONTROL METHOD

CROSS-REFERENCES TO RELATED APPLICATIONS

The present patent application claims the priority of Japanese patent application No. 2020/033128 filed on Feb. 28, 2020, and the entire contents of Japanese patent application No. 2020/033128 are hereby incorporated by reference.

TECHNICAL FIELD

The present invention relates to a vehicle control system and a vehicle control method.

BACKGROUND ART

An in-vehicle unit to be arranged in the dashboard section of a vehicle is known which is provided with a center module to which various optional modules can be removably attached (e.g., see Patent Literature 1).

The center module of the in-vehicle unit has pre-assembled units having predetermined functions and includes at least one module fitting portion. At least one optional module having a predetermined function different from the functions of the units can be detachably fitted to the module fitting portion of the center module.

CITATION LIST

Patent Literature

Patent Literature 1: JP H11/180222 A

SUMMARY OF INVENTION

Technical Problem

The in-vehicle unit disclosed in Patent Literature 1 has difficulty, of extending functionality, such as adding a function to the optional module after fitting or adding a feature obtained by combining functions of plural optional modules.

It is an object of the invention to provide a vehicle control system and a vehicle control method that can easily extend functionality.

Solution to Problem

According to an embodiment of the invention, a vehicle control system comprises:
- a terminal comprising a storage unit to store additional function information generated by software configured to add a new function to functionality of at least one electronic device mounted on a vehicle and a first communication unit to output the additional function information; and
- a vehicle control device comprising a second communication unit to communicate with the terminal through the first communication unit and configured to add a new function to the at least one electronic device based on the additional function information obtained from the terminal through the second communication unit.

According to another embodiment of the invention, a vehicle control method comprises:

obtaining software, which generates additional function information to add a new function to functionality of at least one electronic device mounted on a vehicle, from a server and installing the software on a terminal;
generating the additional function information by using the installed software:
outputting the generated additional function information to a vehicle control device of the vehicle;
obtaining the outputted additional function information by the vehicle control device; and
adding a new function to functionality of the at least one electronic device mounted on the vehicle based on the obtained additional function information.

Advantageous Effects of Invention

According to an embodiment and another embodiment of the invention, it is possible to provide a vehicle control system and a vehicle control method that can easily extend functionality.

BRIEF DESCRIPTION OF DRAWINGS

FIG. 5 is a timing chart relating to addition of a function in the vehicle control system in the embodiment.

DESCRIPTION OF EMBODIMENTS

Summary of the Embodiments

A vehicle control system in an embodiment has a terminal that has a storage unit to store additional function information generated by software configured to add a new function to functionality of at least one electronic device mounted on a vehicle, and a first communication unit to output the additional function information, and a vehicle control device that has a second communication unit that communicates with the terminal through the first communication unit, and a control unit that adds a new function to the at least one electronic device based on the additional function information obtained from the terminal through the second communication unit.

In this vehicle control system, new functions can be added through the software. Therefore, it is possible to easily extend functionality as compared to when electronic devices with new functions are installed.

A vehicle control method in an embodiment of the invention includes obtaining software, which generates additional function information to add a new function to functionality of at least one electronic device mounted on a vehicle, from a server and installing the software on the terminal, generating the additional function information by using the installed software, outputting the generated additional function information to a vehicle control device of the vehicle, obtaining the outputted additional function information by the vehicle control device, and adding a new function to functionality of the at least one electronic device mounted on the vehicle based on the obtained additional function information.

In this vehicle control method, new functions can be added through the software. Therefore, it is possible to easily extend functionality as compared to when electronic devices with new functions are installed.

Embodiment (General Configuration of a Vehicle Control System 1)

Figure 1:
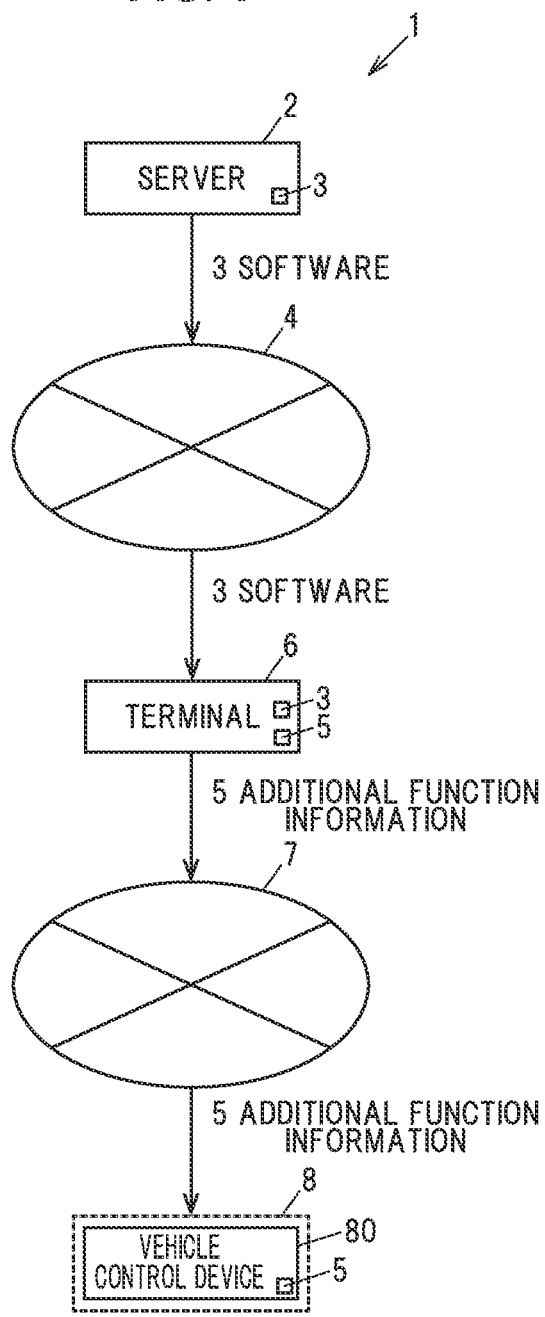
FIG. 1 is an explanatory diagram illustrating a vehicle control system in an embodiment.
Figure 2A:
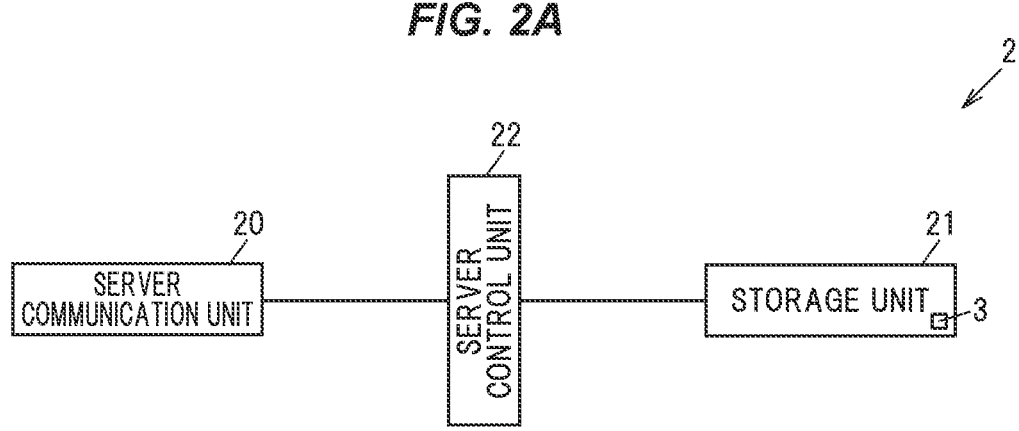
FIG. 2A is a block diagram illustrating a server of the vehicle control system in the embodiment.
Figure 2B:
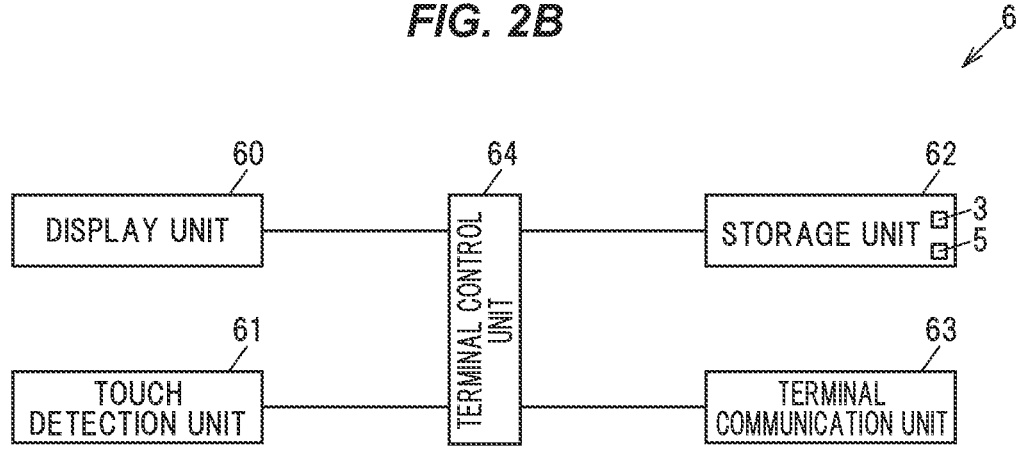
FIG. 2B is a block diagram illustrating a terminal of the vehicle control system in the embodiment.
Figure 2C:
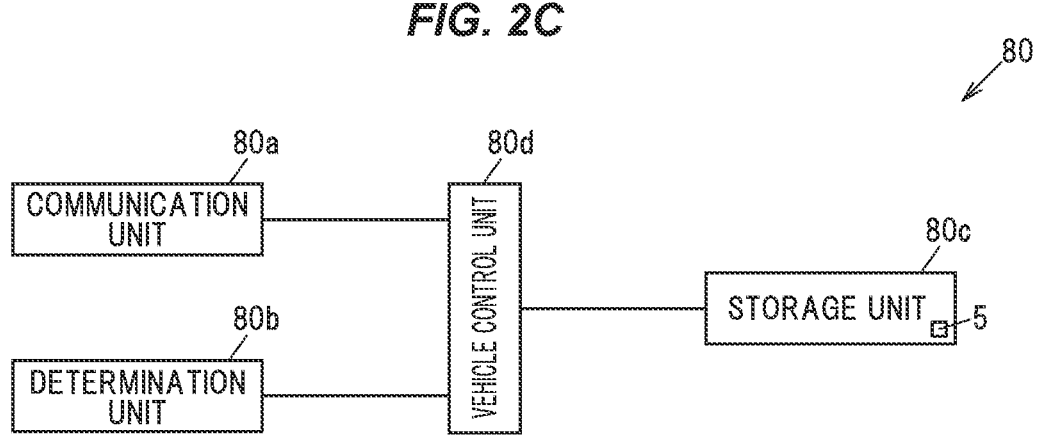
FIG. 2C is a block diagram illustrating a vehicle control device of the vehicle control system in the embodiment.
Figure 3:
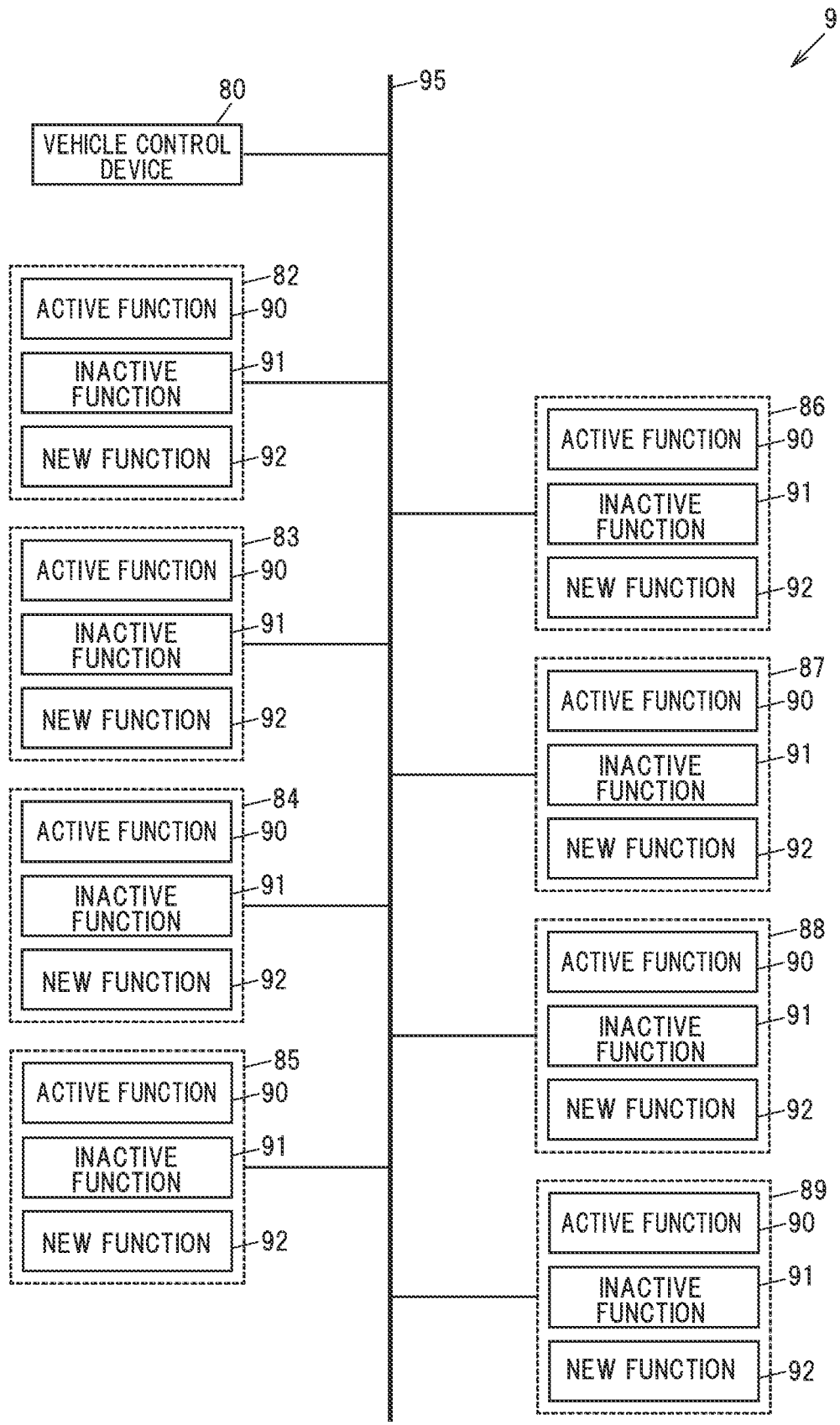
FIG. 3 is a block diagram illustrating a vehicle communication system in a vehicle of the vehicle control system in the embodiment.

FIG. 1 is an explanatory diagram illustrating a vehicle control system. FIG. 2A is a block diagram illustrating a server. FIG. 2B is a block diagram illustrating a terminal, and FIG. 2C is a block diagram illustrating a vehicle control device. FIG. 3 is a block diagram illustrating a vehicle communication system. In FIG. 1, a main flow of information is indicated by arrows.

As shown in FIGS. 1, 2A, 2B and 2C, the vehicle control system 1 includes a terminal 6, which has a storage unit 62 to store additional function information 5 generated by software 3 configured to add a new function to functionality of at least one electronic device mounted on a vehicle 8 and a terminal communication unit 63 as the first communication unit to output the additional function information 5, and a vehicle control device 80 which has a communication unit 80a as the second communication unit that communicates with the terminal 6 through the terminal communication unit 63 and a vehicle control unit 80d as the control unit that adds a new function to the at least one electronic device based on the additional function information 5 obtained from the terminal 6 through the communication unit 80a.

The vehicle control device 80 is mounted on the vehicle 8. The vehicle 8 is sold in different grades with different prices. Plural electronic devices are also mounted on the vehicle 8. As an example, the highest grade vehicle 8 is in a state in which functions with high added-value among executable functions of the plural electronic devices are available, i.e., can be used as active functions 90 in addition to the standard functions, as shown in FIG. 3. On the other hand, as an example, the lowest grade vehicle 8 is in a state in which only the standard functions among executable functions of the plural electronic devices can be used, i.e., mainly the functions with high added-value are inactive functions 91. In this way, for the vehicle 8, all electronic devices are mounted rather than installing different electronic devices depending on the grade, and available functions, i.e., the active functions 90 are different with different grades.

The vehicle 8 is also used as a vehicle that is rented for a fee, such as a rental car or car sharing. For the vehicle 8, the active functions 90 and the inactive functions 91 are set according to, e.g., a rental fee. That is, when the rental fee is high, functions with high added-value are set as the active functions 90. Meanwhile, when the rental fee is low, the standard functions are set as the active functions 90.

Furthermore, the vehicle 8 may be a vehicle that is shared by family members and provides different available functions for each family member. In this vehicle 8, e.g., functions selected according to preferences of family members are set as the active functions 90 and the terminal 6 of each family member stores the selected functions as the additional function information 5.

The additional function information 5 includes new function information to create a new function 92 by combining functions of plural electronic devices, and also includes information to activate the inactive function 91, which has been deactivated among plural functions of at least one electronic device, into the active function 90.

In particular, the vehicle control unit 80d of the vehicle control device 80 changes the inactive function 91 to the active function 90 based on the additional function information 5 and adds a new function 92 executable on an existing electronic device. This new function 92 is a function different from the inactive functions 91 and the active functions 90 which are executable independently. The new function 92 includes, e.g., a newly executable function created using a function A of a first electronic device and a function B of a second electronic device, and an existing function with better accuracy or higher processing speed, etc. Therefore, the vehicle control system 1 can easily extend functionality by changing the inactive function 91 to the active function 90 or adding the new function 92.

As shown in FIG. 1, the vehicle control system 1 further includes a server 2 that transmits the software 3, which generates the additional function information 5, to the terminal 6. The server 2 and the terminal 6 are connected through a network 4. The terminal 6 and the vehicle 8 are connected through a vehicle LAN (=Local Area Network) 7. The vehicle control system 1 includes the server 2, the terminal 6, and the vehicle 8.

(Configuration of the Server 2)

As shown in FIG. 2A, the server 2 includes a server communication unit 20, a storage unit 21, and a server control unit 22. The server communication unit 20 is configured to reciprocally exchange signals and information, etc., with the terminal 6 via the network 4. The storage unit 21 is composed of a storage device such as a semiconductor memory, an HDD (=Hard Disk Drive), or an SSD (=Solid State Drive). The software 3 is stored in the storage unit 21.

The server control unit 22 is a microcomputer composed of a CPU (=Central Processing Unit) performing calculation and processing, etc., of the acquired data according to a stored program, and a RAM (=Random Access Memory) and a ROM (=Read Only Memory) as semiconductor memories, etc. The ROM stores a program for operation of the server control unit 22. The RAM is used as a storage area to temporarily store calculation results, etc.

(Configuration of the Software 3)

The software 3 is a program that manages the active functions 90 and the inactive functions 91 of electronic devices mounted on the vehicle 8 and also generates and manages the new functions 92. The software 3 in the present embodiment is mainly used to change the inactive functions 91 to the active functions 90 and to generate the new functions 92, but it is not limited thereto and it is also used to change the active functions 90, which have been used up to the present, to the inactive functions 91 and to delete the generated new functions 92.

The change from the active functions 90 to the inactive functions 91 and the deletion of the new functions 92 are carried out, e.g., when the active functions 90 and the new functions 92 have an expiration date, when the existing active functions 90 or the new functions 92 become unnecessary due to newly activated active functions 90, or when the active functions 90 or the new functions 92 are deprecated, etc.

As an example, the procedure of changing the inactive function 91 to the active function 90 is performed as follows. For example, a user operates the terminal 6 to connect to the server 2 through the network 4 and purchases the software 3. Next, the user starts up the software 3 downloaded from the server 2. The additional function information 5 is created, e.g., after the software 3 is started up. The additional function information 5 includes information about the active functions 90, the inactive functions 91 and the new functions 92.

When the vehicle 8 is rented for a fee, e.g., the fee for renting the vehicle 8 is included in the purchase price of the software 3. Which active functions 90 are available and whether or not it is possible to use new functions 92 depend on the amount of the rental fee.

(Configuration of the Network 4)

The network 4 connects the server 2 and the terminal 6 wirelessly or wired. The network 4 in the present embodiment is Internet. Wi-Fi (registered trademark) or Bluetooth (registered trademark), etc., may be used as the network 4 when the server 2 is located in a dealer's building or a repair shop, etc., of the vehicle 8.

(Configuration of the Terminal 6)

The terminal 6 is, e.g., a portable terminal such as smartphone or tablet. As shown in FIG. 2B, the terminal 6 includes a display unit 60, a touch detection unit 61, the storage unit 62, the terminal communication unit 63, and a terminal control unit 64.

The display unit 60 is, e.g., a liquid crystal display or an organic EL (=Electro-Luminescence) display. The touch detection unit 61 is arranged to overlap the display unit 60. The touch detection unit 61 is a capacitive multi-touch sensor formed of plural transparent electrodes that intersect while maintaining insulation. The storage unit 62 is a semiconductor memory. The software 3 downloaded from the server 2 and the additional function information 5 are stored in the storage unit 62. The terminal communication unit 63 communicates with the server 2 through the network 4 and communicates with the vehicle 8 through the vehicle LAN 7.

The terminal control unit 64 is a microcomputer composed of a CPU performing calculation and processing, etc., of the acquired data according to a stored program, and a RAM and a ROM as semiconductor memories, etc. The ROM stores a program for operation of the terminal control unit 64. The RAM is used as a storage area to temporarily store calculation results, etc.

(Configuration of the Vehicle LAN 7)

The vehicle LAN 7 is a network which enables reciprocal exchange of signals or information, etc., with the terminal 6 by wired or wireless connection. The vehicle LAN 7 in the present embodiment is Wi-Fi (registered trademark) or Bluetooth (registered trademark), etc.

(Configuration of the Vehicle Control Device 80)

As shown in FIG. 3, the vehicle 8 includes a vehicle communication system 9 in which plural mounted electronic devices are interconnected by an in-vehicle LAN 95. The in-vehicle LAN 95 is, e.g., a network for vehicle which enables reciprocal exchange of signals or information, etc., by wired or wireless connection, such as CAN (Controller Area Network) or LIN (Local Interconnect Network).

The vehicle control device 80 and the plural electronic devices are connected to the in-vehicle LAN 95. As shown in FIG. 2C, the vehicle control device 80 includes the communication unit 80a, a determination unit 80b, a storage unit 80c, and the vehicle control unit 80d. The communication unit 80a communicates with the terminal 6 through the vehicle LAN 7 and also communicates with the plural electronic devices through the in-vehicle LAN 95.

The determination unit 80b determines whether or not the terminal 6 is present in a vehicle cabin. When the determination unit 80b determines that the terminal 6 is present in the vehicle cabin, the vehicle control unit 80d adds a new function to at least one electronic device based on the additional function information 5 obtained from the terminal 6. In other words, change on the active functions 90 and the inactive functions 91 and addition of the new functions 92 are not performed when the terminal 6 is located outside the vehicle 8.

The storage unit 80c is a semiconductor memory. The vehicle control unit 80d is a microcomputer composed of a CPU performing calculation and processing, etc., of the acquired data according to a stored program, and a RAM and a ROM as semiconductor memories, etc. The ROM stores a program for operation of the vehicle control unit 80d. The RAM is used as a storage area to temporarily store calculation results, etc.

When the terminal 6 is located outside the vehicle 8, the vehicle control unit 80d turns a function of allowing for locking and unlocking of the vehicle 8 into the active function 90 based on the additional function information 5 obtained from the terminal 6. That is, the terminal 6 serves as an electronic key of the vehicle 8. At this time, the terminal 6 communicates with the vehicle control device 80, and when the terminal 6 is a device registered to the vehicle 8, the terminal 6 serves as an electronic key. This authentication is successfully completed when, e.g., information of the terminal 6 included in the additional function information 5 matches information registered to the vehicle 8.

When the vehicle 8 is rented out, the user to whom it is rented can use the terminal 6 as an electronic key by downloading and starting up the software 3 on his/her terminal 6 and changing the inactive function 91 related to the electronic key to the active function 90.

As an example, the plural electronic devices are a start switch 82, a locking device 83, an air conditioning device 84, a navigation device 85, a window device 86, a wiper device 87, a vehicle setting device 88, and an automated driving device 89 as shown in FIG. 3, but it is not limed thereto. Each of these electronic devices has the active functions 90 and the inactive functions 91, i.e., activated functions and deactivated functions. In this regard, the electronic devices also include various sensors and cameras, etc.

The start switch 82 is a push switch. The start switch 82, when a push operation is performed on an operating surface thereof, causes a drive device of the vehicle 8 to start in case of an internal combustion engine (an engine), causes preparation for drive in case of a motor to allow for a current supply to the motor, and causes start or preparation for start according to the drive device prioritized at the time of start in case of a hybrid of an internal combustion engine and a motor.

The start switch 82 has, e.g., a biometric information reading device on the operating surface and has a biometric authentication function using this biometric information reading device. This biometric authentication function is set to the inactive function 91 depending on the grade of the vehicle 8. The start switch 82 also has other functions such as ON (allowing all electronic devices to be used) and ACC (allowing some of electronic devices to be used), etc., in addition to starting and stopping the drive device.

The new function 92 of the start switch 82 is, e.g., a biometric information reading function with better accuracy or higher reading speed, etc.

The locking device 83 is a device to lock and unlock portions to be opened and closed, such as a hood, doors and a trunk lid, etc., of the vehicle 8. The locking device 83 has functions such as unlocking the hood, locking and unlocking the doors, automatically locking and automatically unlocking the doors, and unlocking the trunk lid. These functions of the locking device 83 are provided as the active function 90 or the inactive function 91.

The new functions 92 of the locking device 83 are, e.g., functions working in conjunction with a proximity sensor or a door driving device arranged on the vehicle 8, such as opening the doors at a predetermined angle when unlocking the doors, and causing a door handle to come out from the door when the user approaches the vehicle 8, etc. The proximity sensor is a sensor that detects a person, etc., approaching the vehicle 8. The door driving device is a device that drives the door in a direction the door opens.

Automatic door locking is a function of automatically locking the doors when the authenticated terminal 6 moves out of a range defined based on the vehicle 8, and a function of automatically locking the doors when the vehicle 8 travels at not less than a predetermined speed. Automatic door unlocking is a function of automatically unlocking the doors when the terminal 6 capable of being authenticated enters the range and authentication is then successfully completed. The function of causing the door handle to come out is a function of causing the door handle, which is retracted in the door so as to be flush with the door surface, to come out and to be operable.

The air conditioning device 84 is a device to adjust temperature in the vehicle cabin. The air conditioning device 84 has functions such as heating setting, cooling setting, fan-only setting, air conditioning temperature setting, air volume setting, air vent setting, demisting the windshield, demisting the rear window, switching between recirculating and fresh air, auto setting, setting for driver and front passenger seat sides, setting for rear seat side, air purification in the vehicle cabin, and personal setting. These functions of the air conditioning device 84 are provided as the active function 90 or the inactive function 91.

The new functions 92 of the air conditioning device 84 are functions working in conjunction with a raindrop sensor, etc., such as automatically adjusting the air conditioning temperature or the air volume or automatically demisting the windshield or the rear window, according to weather conditions.

Setting for driver and front passenger seat sides is a function of changing the settings for each of the driver's seat and the front passenger seat. Setting for rear seat side is a function of allowing various settings for the rear seats. Personal setting is a function of setting to an air conditioning temperature and an air volume which are set for each user.

The navigation device 85 is a device to display a map and guide a route to a set destination. The navigation device 85 has functions such as displaying a map around the current location, map scale setting, destination setting, registered location setting, recording history, displaying frequent destinations, registering home, searching destination, searching and displaying restaurants or gas stations, etc., registering destinations to icons and buttons, route guidance, displaying plural routes, displaying a fee for each route, and scrolling the route. These functions of the navigation device 85 are provided as the active function 90 or the inactive function 91.

The new functions 92 of the navigation device 85 are functions working in conjunction with a fuel tank level sensor or a battery level sensor, etc., such as searching and displaying nearby gas stations or charging stations on the map or guiding to such a place when the remaining level falls below a certain level, and a function working in conjunction with a function of connecting to the Internet, such as searching and providing information of parking availability or parking fee, etc., around the destination, etc.

Registration of destinations to icons and buttons is a function of registering destinations to icons displayed on the display unit or to physical buttons provided on the main body of the navigation device 85 and searching routes to a registered destination when operated. Scrolling the route is a function of displaying to follow the searched route from the current location to the destination.

The window device 86 is a device to open/close front seat-side windows, open/close rear seat-side windows if any, and open/close a sunroof if any. The window device 86 has functions such as opening/closing the front seat-side and rear seat-side windows, opening/closing the sunroof, fully opening and closing the front seat-side and rear seat-side windows, on/off of a lock switch, and opening/closing by a predetermined amount. These functions window device 86 are provided as the active function 90 or the inactive function 91.

The new functions 92 of the window device 86 are functions working in conjunction with a raindrop sensor, etc., such as automatically closing the windows when the amount of rain becomes more than a certain amount, and automatically increasing a speed of opening/closing the windows when the amount of rain becomes more than a certain amount.

The lock switch is a switch that, when on, does not allow the window to be driven even if a child operates a window opening/closing switch. On/off of the lock switch is a function of turning this lock switch on and off. Opening and closing by a predetermined amount is a function of opening and closing the front seat-side and rear seat-side windows and the sunroof by a predetermined amount when a predetermined operation is performed on switches for opening/closing the windows and the sunroof.

The wiper device 87 is a device to drive windscreen wipers and a rear wiper. The wiper device 87 has functions such as driving the windscreen wipers, driving the rear wiper, setting intermittent drive and drive speed, automatic activation, and spraying windscreen washer fluid. These functions of the wiper device 87 are provided as the active function 90 or the inactive function 91.

The new functions 92 of the wiper device 97 are functions working in conjunction with a raindrop sensor and a shift device, such as automatically activating the rear wiper when the shift device is shifted to the R range during when it is raining. The R range is a shift position to reverse the vehicle 8.

Automatic activation is a function working in conjunction with a raindrop sensor, etc., to automatically activate the windshield wipers when the amount of rain becomes more than a certain amount. In automatic activation, intermittent drive and drive speed are also automatically set according to the amount of rain.

The vehicle setting device 88 is a device to configure the settings for the vehicle 8. The vehicle setting device 88 has functions such as seat position setting, steering wheel position setting, outside mirror angle setting, anti-glare mirror setting, driving mode setting, setting brightness of the display device, setting angle of headlights, setting high and low beam of the headlights, fog light setting, sound volume setting, and battery setting. These functions of the vehicle setting device 88 are provided as the active function 90 or the inactive function 91.

The new functions 92 of the vehicle setting device 88 are, e.g., a function of selecting a design of speed display shown as an image on a display arranged on a meter panel of the vehicle 8, and a function working in conjunction with various sensors and a driving assistance device to set to maximize driving performance.

Anti-glare mirror settings are functions such as turning on/off a mechanism to suppress light reflection on a room mirror, and adjusting the angle of the room mirror. Driving mode setting is a function of switching the driving characteristics of the vehicle 8. The driving modes include, e.g., a mode enabling stable driving even on, e.g., bad roads such as rainy or snowy roads, and a mode allowing for sports driving. In each driving mode, setting of a driving assistance device such as a skid prevention device, a response of the drive device or an accelerator, setting of steering wheel input angle and a steering angle of wheels, and suspension setting, etc., are optimized. Battery setting is a function of setting usable capacity.

The automated driving device 89 is a device to control automated driving. The automated driving device 89 provides functions such as automated driving, lane keeping, forward collision warning, forward collision avoidance braking, cruise control, summoning the vehicle, and parking assistance, etc. These functions of the automated driving device 89 are provided as the active function 90 or the inactive function 91.

The new functions 92 of the automated driving device 89 are, e.g., a function working in conjunction with a GPS (=Global Positioning System), etc., to transmit a parking spot to the terminal 6, a function of optimizing the route to the destination so as not to get stuck behind a slow vehicle, etc., a function of assisting driving in a narrow street, a function of setting the destination according to a schedule on a registered calendar and automatically guiding to the destination, and a function of summoning the vehicle 8 to a location of the terminal 6.

Automated driving includes functions such as automated driving to an entered destination, automated driving to an entered registered location, and automated driving to a location determined by the automated driving device 89. Forward collision warning is a function of providing a warning when there is a high probability of collision with an obstacle such as a vehicle in front. Forward collision avoidance braking is a function of driving a braking device to avoid collision when there is a high probability of collision with an obstacle such as a vehicle in front. Summoning the vehicle is a function of summoning the vehicle to a location where the user operated. Parking assistance is a function of parking the vehicle in a designated parking area. The function of optimizing the route is a function of reducing time to the destination by appropriately changing lanes.

Next, an operation of the vehicle control system 1 in the present embodiment will be described in reference to each drawing. An example of when the user adds the biometric authentication function to the start switch 82 will be described below. The general outline of the vehicle control method in this case is as below. In this regard, the biometric information is a fingerprint in the present embodiment, but is not limited thereto and may be another biometric information such as vein. In the vehicle control system 1, when the vehicle 8 has, e.g., a face authentication function, a function of accepting an operation on the start switch 82 upon successful face authentication may be the new function 92.

The terminal 6 has, based on the software 3 obtained from the server 2, functions of generating the additional function information 5 and reading and transmitting user's biometric information as registered biometric information to the start switch 82 through the vehicle control device 80. The vehicle control device 80 activates the biometric authentication function pre-installed on the start switch 82 based on the additional function information 5 obtained from the terminal 6. The start switch 82 performs biometric authentication by comparing the biometric information, which is read with the biometric authentication function when an operation is performed, to the registered biometric information registered through the terminal 6.

(Operation)

Figure 4A:
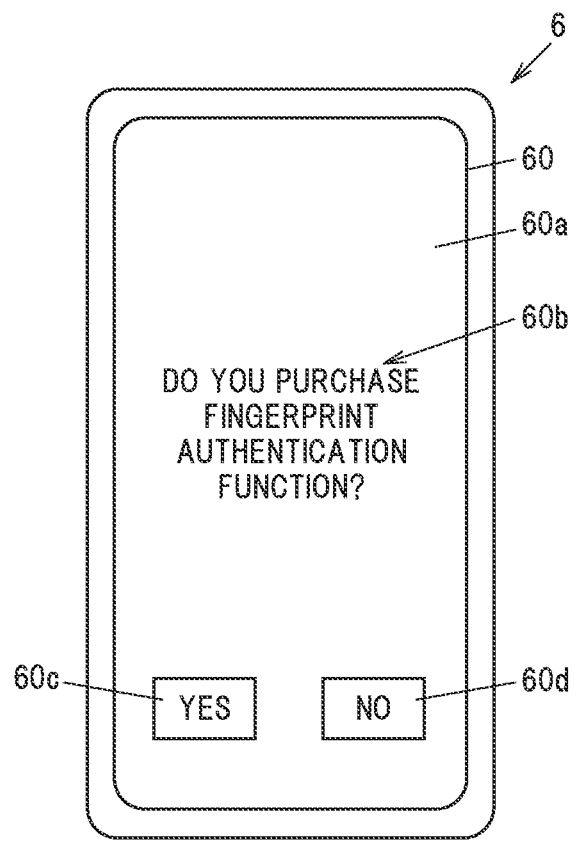
FIG. 4A shows a function purchase screen on the terminal of the vehicle control system in the embodiment.
Figure 4B:
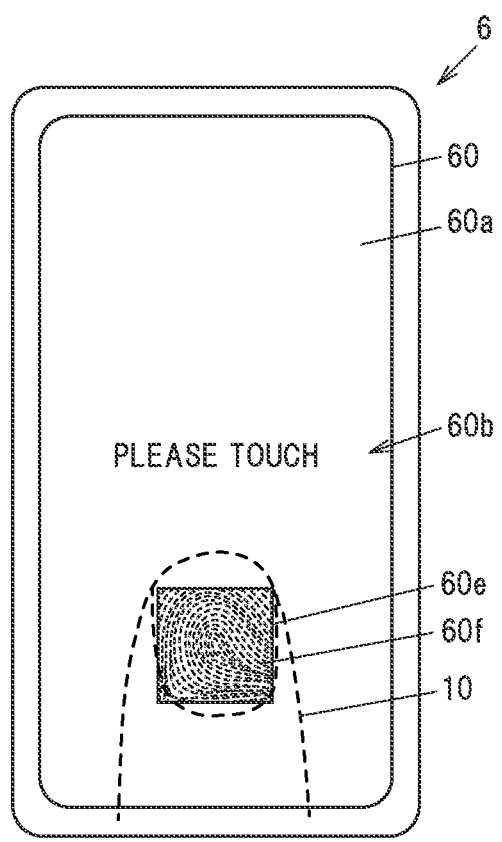
FIG. 4B shows a screen of the terminal of the vehicle control system in the embodiment at the time of fingerprint registration or fingerprint authentication.

FIG. 4A shows an example of a function purchase screen on the terminal, and FIG. 4B shows an example of a screen at the time of fingerprint registration or fingerprint authentication. FIG. 5 shows an example of a timing chart relating to addition of a function. This operation activates a fingerprint authentication function as the biometric authentication function.

The user operates the terminal 6 and connects it to the server 2 (Step 1). Next, after connecting to the server 2, the user selects the fingerprint authentication function to purchase and then purchases the software 3 to add the fingerprint authentication function (Step 2).

FIG. 4A shows an example of a display screen 60*a* shown on the display unit 60 of the terminal 6. The display screen 60*a* shows a message 60*b* about the purchase of the fingerprint authentication function, an icon 60*c* to place an order, and an icon 60*d* to cancel and not purchase. The user performs a touch operation on the icon 60*c* showing "Yes" to place an order or performs a touch operation on the icon 60*d* showing "No" to cancel.

When a touch operation is performed on the icon 60*c* showing "Yes", the server 2 transmits the software 3 selected for purchase to the terminal 6 (Step 3).

The terminal 6 downloads the software 3 from the server 2 and installs it (Step 4). Then, the terminal 6 starts up the installed software 3 based on an operation performed by the user (Step 5).

The software 3, when started up on the terminal 6, generates the additional function information 5 to change the purchased fingerprint authentication function, which is the inactive function 91, to the active function 90 to activate the fingerprint authentication function (Step 6). Starting up the software 3 causes the terminal 6 to have a function of reading the biometric information, i.e., fingerprints, with the touch detection unit 61.

After starting up the software 3, the user makes the terminal 6 read biometric information 60*f*, which is information of a fingerprint of an operating finger 10, to generate registered biometric information used for fingerprint authentication, as shown in FIG. 4B. The biometric information 60*f* is transmitted, as registered biometric information for identification of the user, to the start switch 82.

After the user gets in the vehicle 8, the terminal 6 transmits the additional function information 5, which is generated by the software 3, to the vehicle control device 80 through the vehicle LAN 7 (Step 7).

Once obtaining the additional function information 5 through the terminal 6 and the vehicle LAN 7, the vehicle control unit 80*d* of the vehicle control device 80 changes the fingerprint authentication function, which is the inactive function 91, to the active function 90 to activate the added function based on the additional function information 5 (Step 8).

After the fingerprint authentication function is changed to the active function 90, the terminal 6 transmits the biometric information 60f of the operating finger 10, which is read for registration, as registered biometric information to the start switch 82 through the vehicle LAN 7 and the vehicle control device 80. A reading area 60e shown in FIG. 4B is a portion of the touch detection unit 61 and is an area for a fingerprint reading function added by the software 3. The user provides the biometric information 60f by touching the reading area 60e with a finger he/she wants to register. As a modification, the registered biometric information may be included in the additional function information 5.

The start switch 82 performs biometric authentication by comparing the biometric information, which is read with the biometric authentication function when the operation is performed, to the biometric information 60f registered through the terminal 6.

Effects of the Embodiment

The vehicle control system 1 in the present embodiment can easily extend functionality. In this vehicle control system 1, all executable functions of plural electronic devices mounted on the vehicle 8 are divided into the active functions 90 and the inactive functions 91. In addition, in the vehicle control system 1, a combination of functions of the already-mounted electronic devices can be used as the new function 92. Without having to purchase and install an electronic device that executes a new function or a desired function, the user can use the desired function by changing the inactive function 91 to the active function 90 and by combining functions into a new function 92 by the software 3 purchased from the server 2. Therefore, functionality of the vehicle control system 1 can be easily extended without spending time and effort since the user does not need to purchase and install an electronic device having a new function or a desired function.

The vehicle control system 1 preliminarily includes substantially all functions executable by the plural electronic devices mounted on the vehicle 8 and also allows a combination of functions to be used as the new function 92. Therefore, it is not necessary to purchase electronic devices to add new functions and the cost is thus reduced.

In the vehicle control system 1, it is possible to change the active functions 90, the inactive functions 91 and the new functions 92 for each terminal 6. Therefore, as compared to when it is not possible to change, different functions can be available for different family members.

In the vehicle control system 1, when the vehicle 8 is used as a rental vehicle or a vehicle rented out for car sharing, a function of the electronic key can be changed to the allowed function 90 by purchasing the software 3 through the server 2 and can be rented without directly handing over the key to the contracted user. In addition, in the vehicle control system 1, it is possible to change available functions for each contracted user according to the amount of rental fee.

Although some embodiment and modifications of the invention have been described, these embodiment and modifications are merely examples and the invention according to claims is not to be limited thereto. These new embodiment and modifications thereof may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications thereof are included within the scope and gist of the invention and also within the invention described in the claims and the range of equivalency.

REFERENCE SIGNS LIST

1 VEHICLE CONTROL SYSTEM
2 SERVER
3 SOFTWARE
5 ADDITIONAL FUNCTION INFORMATION
6 TERMINAL
8 VEHICLE
60f BIOMETRIC INFORMATION
80 VEHICLE CONTROL DEVICE
80b DETERMINATION UNIT
82 START SWITCH
83 LOCKING DEVICE
90 ACTIVE FUNCTION
91 INACTIVE FUNCTION
92 NEW FUNCTION

The invention claimed is:

1. A vehicle control system having a hardware processor, comprising:
a terminal comprising a storage unit to store additional function information generated by software configured to add a new function to functionality of at least one electronic device mounted on a vehicle and a first communication unit to output the additional function information; and
a vehicle control device comprising a second communication unit to communicate with the terminal through the first communication unit and configured to add the new function to the at least one electronic device based on the additional function information obtained from the terminal through the second communication unit,
wherein the additional function information comprises new function information to create the new function by combining functions of a plurality of different types of electronic devices, the new function being a function different from an inactive function and an active function that are executable independently by each of the plurality of different types of electronic devices, and also comprises information to activate an inactive function, which has been deactivated among a plurality of functions of the at least one electronic device, into an active function.

2. The vehicle control system according to claim 1, wherein the vehicle control device comprises a determination unit to determine whether or not the terminal is present in a vehicle cabin, and is configured to add the new function to the at least one electronic device based on additional function information obtained from the terminal when the determination unit determines that the terminal is present in the vehicle cabin.

3. The vehicle control system according to claim 1, further comprising a server that includes the hardware processor to transmit the software, which generates the additional function information, to the terminal.

4. The vehicle control system according to claim 1, wherein the terminal comprises a mobile terminal including a smartphone or a tablet.

5. The vehicle control system according to claim 1, wherein the vehicle control device is mounted on the vehicle that is rented for a fee or shared.

6. The vehicle control system according to claim 1, wherein the new function information includes a newly executable function created using a function of a first electronic device and a function of a second electronic device of a different type than the first electronic device.

7. A vehicle control system having a hardware processor, comprising:
- a terminal comprising a storage unit to store additional function information generated by software configured to add a new function to functionality of at least one electronic device mounted on a vehicle and a first communication unit to output the additional function information;
- a vehicle control device comprising a second communication unit to communicate with the terminal through the first communication unit and configured to add a new function to the at least one electronic device based on the additional function information obtained from the terminal through the second communication unit;
- a server that includes the hardware processor to transmit the software, which generates the additional function information, to the terminal,
- wherein the terminal has, based on the software obtained from the server, functions of generating the additional function information and reading and transmitting user's biometric information as registered biometric information to a start switch as the electronic device through the vehicle control device, wherein the vehicle control device activates a biometric authentication function pre-installed on the start switch based on the additional function information obtained from the terminal, and wherein the start switch performs biometric authentication by comparing the user's biometric information, which is read with the biometric authentication function when an operation is performed, to the registered biometric information registered through the terminal.

8. The vehicle control system according to claim 7, wherein the terminal transmits the registered biometric information included in the additional function information to the start switch.

9. The vehicle control system according to claim 7, wherein the terminal reads a fingerprint as the user's biometric information, and wherein the biometric authentication function is configured to perform fingerprint authentication.

10. A vehicle control method, comprising:
- obtaining software, which generates additional function information to add a new function to functionality of at least one electronic device mounted on a vehicle, from a server and installing the software on a terminal;
- generating the additional function information by using the installed software;
- outputting the generated additional function information to a vehicle control device of the vehicle;
- obtaining the outputted additional function information by the vehicle control device; and
- adding the new function to functionality of the at least one electronic device mounted on the vehicle based on the obtained additional function information,
- wherein the additional function information comprises new function information to create the new function by combining functions of different types of a plurality of electronic devices, the new function being a function different from an inactive function and an active function that are executable independently by each of the plurality of different types of electronic devices, and also comprises information to activate an inactive function, which has been deactivated among a plurality of functions of the at least one electronic device, into an active function.

11. The vehicle control system according to claim 10, wherein the new function information includes a newly executable function created using a function of a first electronic device and a function of a second electronic device of a different type than the first electronic device.

* * * * *